Feb. 16, 1932.  W. H. TOPP  1,845,995
BRAKE ACTUATING MECHANISM
Filed Jan. 8, 1927  2 Sheets-Sheet 2
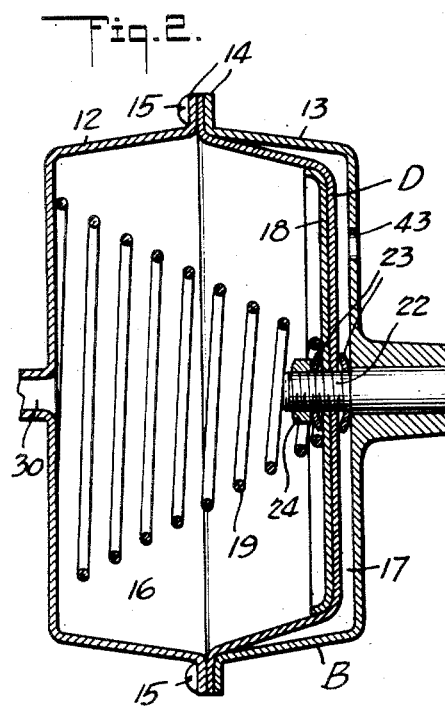
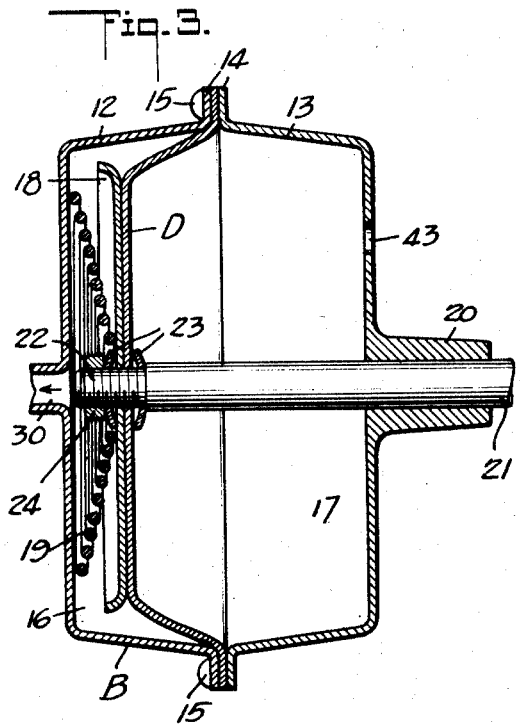
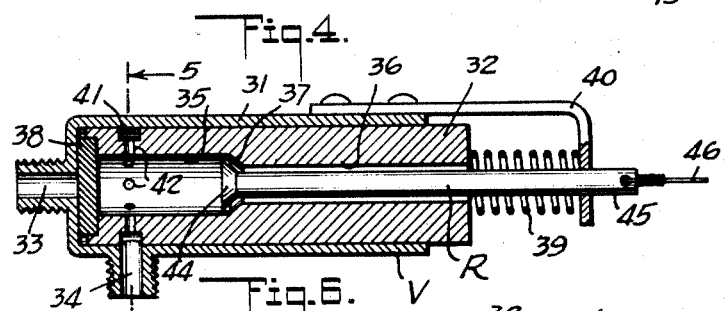
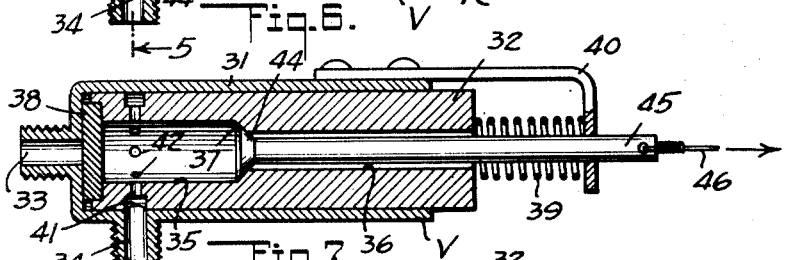
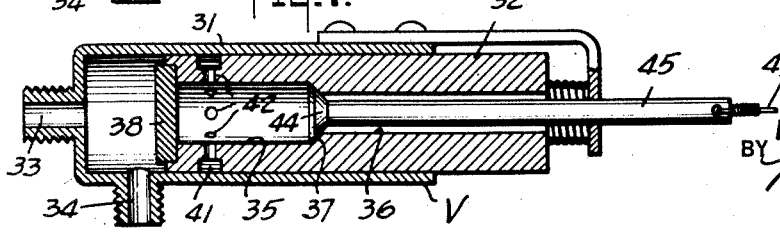
INVENTOR
WILLIAM H. TOPP
BY
ATTORNEY Patented Feb. 16, 1932

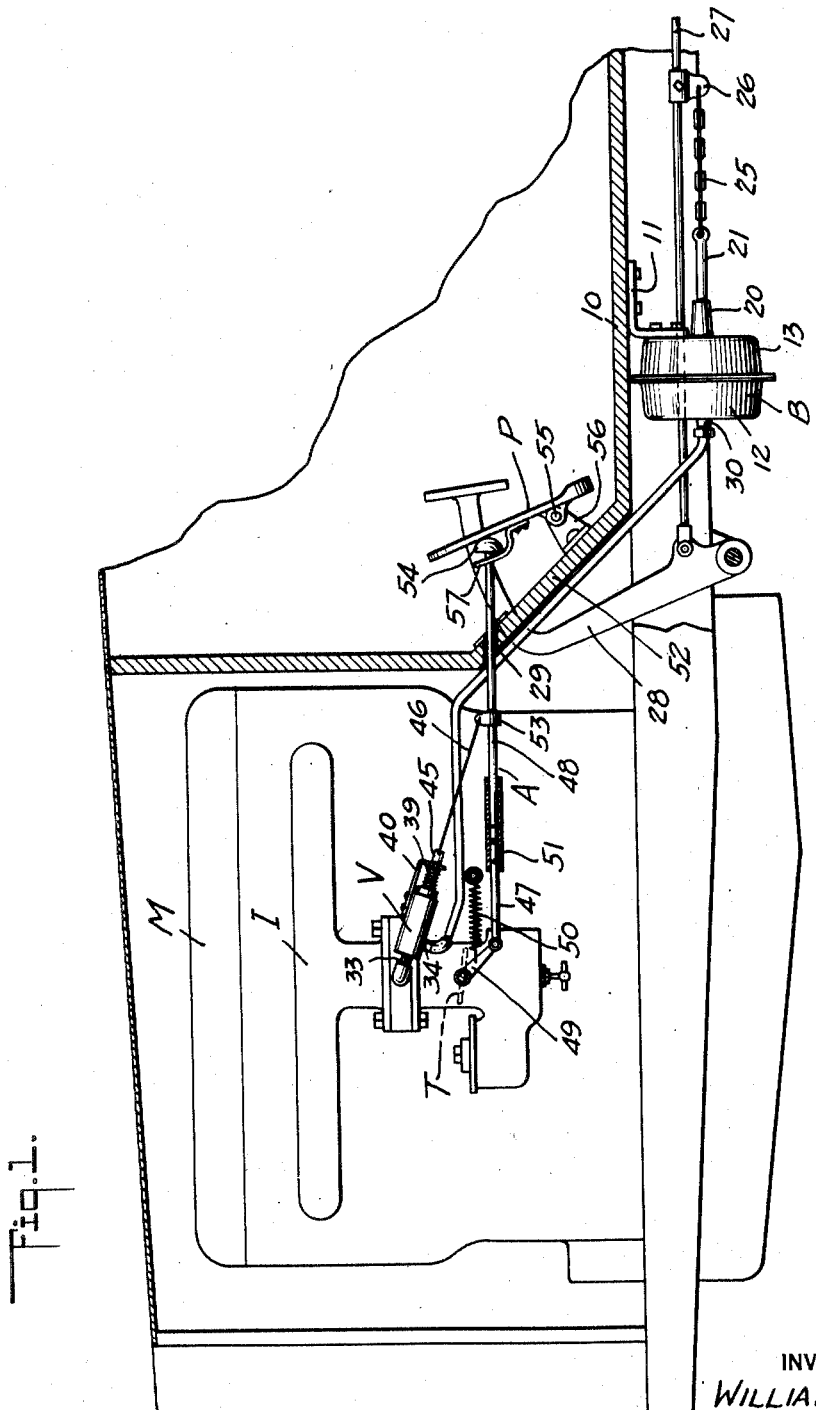

1,845,995

UNITED STATES PATENT OFFICE

WILLIAM H. TOPP, OF LOS ANGELES, CALIFORNIA, ASSIGNOR, BY MESNE ASSIGNMENTS, TO THE STARR PIANO COMPANY, OF RICHMOND, INDIANA, A CORPORATION OF INDIANA

BRAKE ACTUATING MECHANISM

Application filed January 8, 1927. Serial No. 159,953.

My invention relates to vehicle brakes, and has for its purpose the provision of an actuating mechanism therefor which is associated with the usual throttle actuating mechanism of a motor vehicle to permit the manual operation of either mechanism with such facility as to eliminate the heretofore handicap in operating the throttle and brakes in succession as when suddenly starting or stopping, whereby, one is enabled to operate the throttle and brakes in rapid succession with the result of permitting the operator to have complete and instantaneous control of the vehicle in its starting and stopping movements which is of valuable use in the control of a vehicle particularly in traffic.

It is also a purpose of my invention to provide a brake control apparatus of the above described character in which the suction of air created by the vehicle's motor is utilized to actuate a pneumatic means under the control of a valve operatively associated with the accelerator pedal of the vehicle in such manner that the pedal can be moved in the usual way to control the throttle valve of the vehicle and yet can be actuated to operate the air valve independently of the throttle valve to effect an application of the brakes, all in a manner to permit the successive actuation of either valve with the requisite rapidity necessary to effect a sudden starting or stopping of the vehicle.

I will describe only one form of brake actuating mechanism embodying my invention and will then point out the novel features thereof in claims.

In the accompanying drawings:

Figure 1 is a view showing in side elevation one form of brake actuating mechanism embodying my invention applied to a motor vehicle;

Figure 2 is a vertical sectional view illustrating the pneumatic means embodied in my invention and occupying an inactive or brake releasing position;

Figure 3 is a view similar to Figure 2 and showing the pneumatic means in active or brake applying position;

Figure 4 is a view in vertical longitudinal section of the air valve for controlling the pneumatic means;

Figure 5 is a transverse sectional view taken on the lines 5—5 of Figure 4 and looking in the direction of the arrows; and Figures 6 and 7 are views illustrating other positions of the air valve.

Referring specifically to the drawings in which similar reference characters designate similar parts in each of the several views, and particularly to Figure 1, my invention in its present embodiment comprises generally a fluid brake actuating unit B, a control valve V therefore, and actuating means designated generally at A and by which the valve V and the conventional throttle valve T of the motor M of a vehicle are adapted to be actuated independently of each other from a single actuating member comprising in the present instance an accelerator pedal P.

The unit B in its present form comprises a cylinder supported in fixed position below the floor boards 10 of the vehicle by means of an L shaped bracket 11. The cylinder (Figures 2 and 3) is preferably constructed of a pair of cup shaped metal sections 12 and 13 provided with peripheral flanges 14 between which is interposed a flexible diaphragm D of rubberized fabric or other suitable material. Fastening members 15 extend through the flanges and diaphragm and serve to secure the sections together in confronting relation to thus provide suction and pressure chambers 16 and 17 respectively in the cylinder at opposite sides of the diaphragm.

The diaphragm is also cup shaped to permit of its being flexed from the inactive or brake releasing position shown in Figure 2 to the active or brake applying position shown in Figure 3, and at one side of the diaphragm is arranged a metal supporting disk 18 engaged by a conical coil spring 19 for urging the diaphragm to the position shown in Figure 2. Extending through a hub 20 formed on the section 13 is a rod 21 having a reduced threaded end 22 extending centrally through the diaphragm and disk and provided with convex washers 23 engaging the diaphragm and disk while a nut 24 serves to firmly secure them to the rod 21. The opposite end of the rod extends rearwardly of the vehicle for connection to its brake mechanism (not shown) by means of a short length of chain 25 connected to a bracket 26 secured to a brake rod 27 forming a part of the brake mechanism and to which is directly connected the usual brake lever 28. It will be clear that by the provision of the chain 25 the brake lever 28 can be depressed by the foot of the operator to exert a pull upon the brake rod 27 without actuating the diaphragm D, to the end that a manual application of the brakes can be effected when desired.

In the present instance the diaphragm D is adapted to be moved from the position shown in Figure 2 to that shown in Figure 3 upon the exhausting of air from the suction chamber 16 under the action of suction created in the intake manifold I of the motor M. For this purpose a suction pipe 29 is connected to the section 12 and communicates with the suction chamber 16 through a port 30, the opposite end of the pipe being connected to the valve V which is in turn connected to the intake manifold and is adapted to be actuated to control the suction in the pipe 29 in a manner to be hereinafter fully described.

Referring to Figures 4 to 7 inclusive, it will be seen that the valve V comprises a valve body 31 in the form of a cylinder open at one end to permit the insertion of a piston valve 32. The opposite end of the valve body is closed and provided with a tubular threaded projection constituting an outlet port 33 and by which the body is connected to the intake manifold I in any suitable manner so as to be in communication with the interior of the manifold, while the valve body is further provided adjacent its closed end with a lateral tubular projection constituting an inlet port 34 and to which the pipe 29 is connected. The valve 32 is bored lengthwise to provide communicating passages 35 and 36 of different diameters so as to provide at their meeting ends a conical valve seat 37, while the inner end of the valve is recessed to receive a gasket 38 closing the outer end of the passage 35 and adapted to seat against the closed end of the valve body when the valve is in the closed position shown in Figure 4, to which position it is urged by a coil spring 39 interposed between the outer end of the valve and an L shaped bracket 40 secured to the valve body 31. The valve 32 is recessed at one point to provide an annular passage 41 which is in alinement with the inlet port 34 when the valve is closed. A circular series of ports 42 extend from the passage 41 through the wall of the valve so that with the latter closed the suction chamber 16 will be in communication with the atmosphere through the pipe 29, inlet port 34, annular passage 41, ports 42, and passages 35 and 36, to the end that the diaphragm D will normally occupy the position shown in Figure 2 under the action of its spring 19. In this connection it will be noted that the section 13 is provided with a vent port 43 to permit the free ingress and egress of air to and from the chamber 17.

Movable in the valve 32 is a relief valve R having a conical head 44 and an elongated stem 45, the head being freely movable in the passage 35 and adapted to engage the seat 37 so as to close the suction chamber 16 from atmosphere. The stem 45 extends freely through an opening formed in the bracket 40 for connection to a short length of flexible cable 46 constituting part of the actuating means A.

Referring again to Figure 1 the actuating means in the present instance comprises a rod formed in two sections 47 and 48, the former extending forwardly and connected to the actuating arm 49 of the throttle valve T, a spring 50 being connected to the arm and to a convenient point on the motor so as to normally urge the throttle valve to closed position. A sleeve 51 is secured to the rod section 47 and projects beyond the rear end thereof for the reception of the forward end of the rod section 48 and serves to maintain the two sections in longitudinal alinement, yet permitting relative sliding movement thereof. The rod section 48 extends rearwardly through an opening in the footboard 52, and secured to the section is a collar 53 having an ear to which is connected the flexible cable 46 leading to the relief valve R. The rear end of the rod section 48 is provided with a head 54 which is directly engaged by the accelerator pedal P in the present instance comprising a foot plate mounted for pivotal movement about the point 55 on a bracket 56 secured to the footboard 52. A clip 57 is secured to the underside of the pedal P and has its free end bifurcated to receive the rod section 48 immediately behind the head 54 so that when the pedal is either depressed or elevated, movement of the rod section 48 will be effected.

The operation of the brake control apparatus is as follows:

In the normal operation of the vehicle and with the unit B, control valve V and accelerator pedal P occupying their normal positions shown in Figures 2, 4 and 1 respectively, fuel is supplied to the motor M upon a depression of the pedal by the foot of the operator, this movement causing the rod section 48 to be moved forwardly so as to push against the rod section 47 thus correspondingly moving the latter and opening the throttle valve T against the action of its spring 50. The movement of the rod section 48 is ineffective to actuate the valve V as slack is merely formed in the cable 46.

To close the throttle valve, the operator merely raises his foot sufficiently to permit the throttle to return to its closed position under the action of its spring 50, the rod sections 47 and 48 acting as a single rod to return the pedal P to its normal position. It will be noted in this connection that in the closed position of the throttle it is adjusted so that it will permit the passage of fuel in sufficient quantity for "idling" the motor as is the usual practice. To apply the brakes the operator rocks the pedal by pressure of the heel against the lower end of the pedal and below its pivot 55 to further elevate the upper end of the pedal and thus exert a pull upon the rod section 48 which slides rearwardly within the sleeve 51 and away from the rod section 47. This movement of the section 48 exerts a pull upon the cable 46 to first cause the relief valve R to seat as shown in Figure 6 and then through the medium of the head 44 of the relief valve to pull upon the valve 32 and move it to the open position shown in Figure 7, in which communication is established between the ports 33 and 34. The suction created by the motor M in its intake manifold is now free to exhaust air from within the suction chamber 16 through the pipe 29 and thus cause the diaphragm D to move to the position shown in Figure 3 and exert a pull upon the brake rod 27 to effect an application of the brakes.

When it is desired to release the brakes the pressure against the lower end of the pedal is removed permitting the suction of the motor, aided by the spring 39 to draw the valve 32 to closed position and thus cut off the suction from the chamber 16, while through the medium of the relief valve R and cable 46 the rod section 48 and pedal P are also moved to the normal position shown in Figure 1. The negative pressure existing within the pipe 29 and suction chamber 16 acts through the inlet port 34, annular passage 41, ports 42 and passage 35 to unseat the relief valve R and thus permit air from atmosphere to enter the suction chamber 16 so that the usual springs provided in the brake mechanism of the vehicle (not shown) will be free to return the diaphragm D to the brake releasing position shown in Figure 1, the spring 19 functioning to insure the return of the diaphragm in the event that the springs of the brake mechanism fail to do so.

From the foregoing operation, it will be manifest that by rocking the pedal P forwardly and rearwardly the opening of either valve can be effected and with such facility as to allow successive actuations of the valve with such a degree of rapidity as to permit the operator to effect the instantaneous starting or stopping of the vehicle. In actual practice it has been found that the ease with which the pedal P can be operated to apply the brakes or accelerate the motor gives to the operator a degree of control of the vehicle which is absolute and of great advantage in its manipulation in traffic.

Although I have herein shown only one form of brake actuating mechanism embodying my invention, it is to be understood that various changes and modifications may be made therein without departing from the spirit of the invention and the spirit and scope of the appended claims.

I claim:

1. A valve for controlling the exposure of a port alternately to sub-atmospheric pressure and normal pressure, comprising a cylinder having a port at one end to which a source of suction may be connected, a hollow member slidable in said cylinder and having a closed end capable of covering said port from the inside of said cylinder, a stem entering said hollow member through a passage in the end of the hollow member opposite its closed end, said stem having a head forming a relief valve, a port in said cylinder opening into the hollow of said hollow member when the closed end of the hollow member maintains the first-named port closed under the suction therein, and means for closing said relief valve and for moving said hollow member against the action of the suction in said first-named port and from its position closing the first-named port.

2. A valve for controlling the exposure of a port alternately to sub-atmospheric pressure and normal pressure, comprising a cylinder having a suction port at one end and a second port, a hollow member slidable in said cylinder and normally held by suction against the suction port, said two ports being maintained out of communication when said hollow member is in its normal position, said hollow member having a passage therethrough connecting the second cylinder port with the atmosphere when the hollow member is in normal position, and means for displacing said hollow member from normal position, said means comprising a stem extending within said hollow member and a valve engageable from within said hollow member and with the wall of the passage through said hollow member.

WILLIAM H. TOPP.